June 24, 1947. L. W. WACHTER ET AL 2,422,812
WELDER HANDLE
Filed April 7, 1945
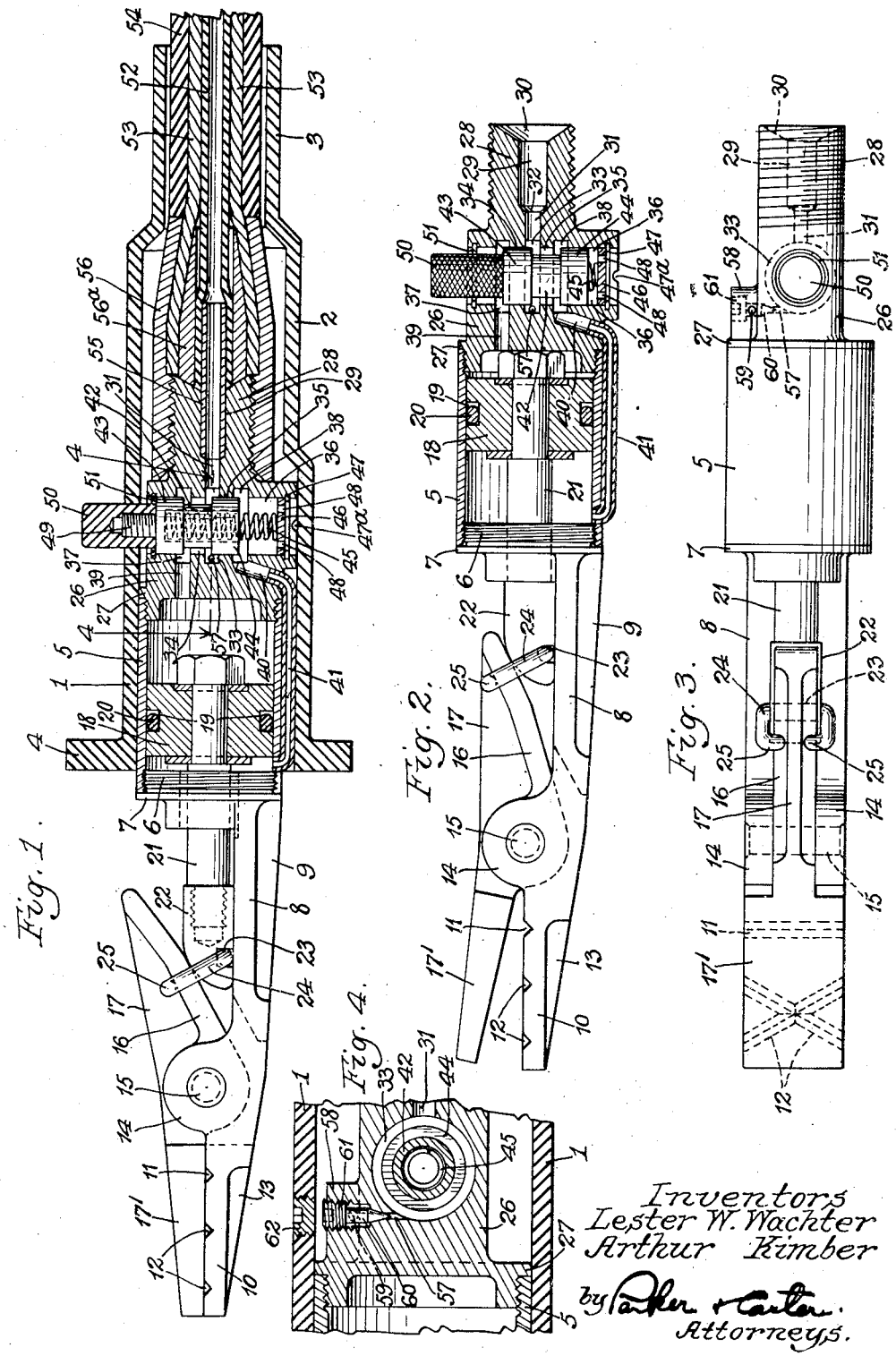
Inventors
Lester W. Wachter
Arthur Kimber
by Parker & Carter
Attorneys.

Patented June 24, 1947

2,422,812

UNITED STATES PATENT OFFICE 2,422,812

WELDER HANDLE

Lester W. Wachter and Arthur Kimber, Streator, Ill., assignors to Anthony Company, Streator, Ill., a corporation of Illinois Application April 7, 1945, Serial No. 587,104

16 Claims. (Cl. 219—8)

This invention relates to a welder handle and has for one object to provide a handle for releasably holding welding rods.

Another object is to provide a welder handle with fluid pressure operated means for controlling the rod-gripping jaws.

Another object is to provide a handle provided with means for cooling the same.

A further object is to provide a welder handle so arranged that the pressure fluid which operates the jaw-controlling means also acts as the coolant for the handle.

Other objects will appear from time to time throughout the specification and claims.

This invention is illustrated more or less diagrammatically in the accompanying drawings, wherein:

Figure 1 is a longitudinal section through one form of the device, with the jaw mechanism shown in elevation;

Figure 2 is a similar view with parts omitted and with the jaws in different position from that shown in Figure 1;

Figure 3 is a top plan view of the mechanism shown in Figure 2, with the handle enclosure removed; and Figure 4 is a transverse section taken at line 4—4 of Figure 1.

Like parts are indicated by like characters throughout the specification and the drawings.

The mechanism may be received in a handle of suitable shape which is preferably of insulating material. The handle includes a member 1 of generally rounded cross section, although it need not be circular. It may be reduced, as at 2, and further reduced, as at 3. It is preferably provided with a laterally directed flange 4. The handle may have any desired shape suitable for enclosing the mechanism within it and suitable for gripping by the hand of an operator.

The mechanism includes a cylinder 5, to one end of which is secured a base 6. This base is preferably provided with an integral flange 7, which serves as a stop to limit the movement of the base 6 into the cylinder.

Mounted on and preferably integral with the base 6 is a jaw member 8. This member may be of any desired shape or construction. As shown, it has a stiffening or reinforcing rib 9. The jaw member is provided with a jaw portion 10 in which welding rod receiving grooves or notches 11 and 12 are formed. The grooves 11 are transverse and the grooves 12 diagonal with respect to the jaw portion 10.

A stiffening or reinforcing rib 13 may be provided, if desired, for the jaw portion. Eyes 14 are formed preferably integrally with the portion 8 and they receive a pin 15 upon which a movable member 16 is pivoted. This member as shown is provided with a stiffening rib 17 and with a jaw portion 17′ which is arranged to cooperate with the jaw 10 to grip a welding rod.

Mounted to reciprocate within the cylinder 5 is a piston 18, grooved as at 19 to receive a packing 20. A piston rod 21 is secured to the piston 18 and extends through the member 6. This piston rod 21 carries, at its outer end, a wedge member 22, which is notched, as at 23. A link 24 is movably mounted in the notch 23 and is provided with inwardly turned ends 25 which engage the movable jaw member 16.

At its opposite end the cylinder 5 has seated in it a valve and inlet housing member 26. This member may be provided with a flange or stop 27 which limits its movement in the seating direction in the cylinder 5. The housing member 26 may have a reduced and exteriorly threaded part 28 upon or about which a combined cable and fluid conduit is secured.

A fluid inlet passage 29 is formed in the part 28. It may be flared, as at 30, and reduced, as at 31, to form a shoulder 32. The passage 31 communicates with a valve chamber formed in the housing 26. This valve chamber includes the annular passage 33, the valve guiding portions 34, 35 and 36. It includes also two annular passages 37 and 38. An outlet passage 39 leads from the passage 37 to one end of the cylinder 5. An outlet passage 40 leads from the passage 38 and is connected to a conduit 41 which communicates with the opposite end of the cylinder 5.

A valve member 42 is mounted to reciprocate within the valve chamber above described. The valve includes two enlargements 43 and 44 of some suitable diameter to engage and slide in the parts 34, 35 and 36. At its lower or outer end the valve 42 receives a spring 45 which is biased to raise the valve and is seated on a member 46 which is held in place by a member 47. The member 46 is ported, as at 48. The housing 26 may be notched, as at 47a.

At its opposite end the valve has a reduced threaded part 49 upon which a handle or operating part 50 is screwed. This handle 50 is preferably formed of insulating material and projects through a suitable opening in the outer handle 1. A retaining part 51 prevents the valve 42 from being forced too far outwardly by the spring 45.

Pressure fluid is conducted to the valve assembly through a tube 52 which is flexible and capable of withstanding substantial internal pressure. Positioned about the tube 52 are conductors 53, which may be in the form of a cable. An insulating envelope 54 surrounds the tube and the conductors. All parts of the composite cable except the conductors 53 are preferably formed of insulating material. The inner tube 52 is received upon a tube 55 fixed in the passage 29. The conductors are gripped by a tapered threaded collar 56, which is engaged on the threaded member 28. A spacer 56a may be placed about the tubes 52 and 55.

A bleeder passage 57 leads from the annular passage 33 through a projection 58 to the outside of the housing 26, but within the handle 1. One or more outlets 59 are provided from the passage 57. A needle valve 60 is provided to regulate or to close the passage 57. This valve 60 may have a threaded part 61 for adjustment. The handle 1 may have an opening, closed by a threaded plug 62, for access to the needle valve to adjust it. This opening may be omitted and the handle removed to adjust the valve.

Although we have shown an operative form of our invention, it will be recognized that many changes in the form, shape and arrangement of parts can be made without departing from the spirit of the invention, and our showing is therefore to be taken as, in a sense, diagrammatic. In particular, the tube or core 52 may be made of any desirable material, such as rubber or neoprene or other synthetic rubber or other synthetics. It is advantageous to make this core of a material which is not affected by oils or lubricants. Some such oils are normally present in compressed air and have a deleterious effect on natural rubber. It is therefore preferable to make the tube or core 52 of some material not normally affected by such lubricants.

The use and operation of this invention are as follows:

With the parts assembled as shown, the device is connected to a source of fluid under pressure and to a source of electrical current. The fluid is ordinarily air.

When welding it to take place, the mechanism must be operated to open the jaws to permit the insertion of a welding rod. The spring 45 normally urges the valve in the position shown in Figure 1 and in that position air enters through the tube 52, the passage 29, the restriction 31, the passage 39 and passes to the cylinder 5, carrying the piston 18 to the position shown in Figure 1. In that position the wedge or cam member 22 is crowded under the portion 16 of the movable jaw and, tilting it about the pin 15, moves its portion 17' toward the portion 18 of the fixed jaw and holds the two together.

Assuming that no rod is in position and one is to be inserted, the valve is depressed by pressing on the handle 50 until it occupies the position shown in Figure 2. In that position air moves from the passage 33 to the passage 38. Thence it moves through the passage 40 and the conduit 41 to the left hand end of the cylinder 5 as shown in Figure 2 and the piston 18 is carried to the right. Thus the wedge portion 22 is moved to the right and by means of the link 24 tilts the movable jaw to the open position of Figure 2.

A welding rod may now be inserted to be engaged in the grooves 11 or 12 or to be otherwise retained between the jaws. When the welding rod has been inserted into position, the valve is released and is raised by the spring 45. The direction of air is reversed and the piston is moved to the position of Figure 1, in which it grips the welding rod and holds it until the valve is again manipulated.

When the piston moves from the position of Figure 1 to that of Figure 2, the air which has been on the right hand of the piston 18 escapes backward through the passage 39 to the passage 37 and escapes outwardly from the housing through the clearance which at that time remains about the valve handle 50, as shown in Figure 2. When the valve is moved back to the position of Figure 1, to accomplish the reverse movement of the piston 18, as it moves from the position of Figure 2 to that of Figure 1, air which has been on the left hand side of the piston is discharged through the conduit 41, the passage 40 and downwardly through the clearance about the spring as shown in Figure 1 and outwardly through the perforations 48 in the member 46.

The bottom of the housing 26 below the member 46 may be grooved or notched, as shown in Figures 1 and 2, to permit ready escape of air into the handle. The grooves may be omitted and the fit of the handle about the housing will ordinarily be loose enough to permit ready escape of the air.

For some purposes it is desirable to discharge a greater quantity of air into the handle. For this purpose the bleeder passage 57 is provided. If the needle valve 60 is closed, no escape will occur through this passage. If, however, the valve is opened, air will pass through the passage 57 and outwardly through the duct or ducts 59 into the interior of the handle.

The mechanism shown and described accomplishes the following purposes: It provides a power operated means for moving the jaws to permit removal and replacement of welding rods. It supplies current to the mechanism for welding and it supplies an adjustable and controllable quantity of air to the handle for cooling. The passage of the air through the handle effects cooling and this cooling effect is augmented by a refrigerating effect which occurs when the air under pressure is discharged from the housing into and about the handle. The expansion of air which occurs at this time provides a cooling additional to that which would be caused by the mere passage and flow of the air without any change in pressure.

In the normal operation of the mechanism the jaws are held positively together by air pressure acting through the piston and cylinder assembly, the rod 21 and the wedge or cam portion 22. The jaws are also positively separated or withdrawn by the piston, moving in the reverse direction in which the link 24 serves to open the jaws or to move them apart.

We claim:

1. In combination in a welder handle, a pair of jaws, one of said jaws being fixed and the other being movably mounted upon said fixed jaw, and means for tilting said movable jaw toward and from said fixed jaw, said means including a piston and cylinder assembly, and means for supplying air under pressure to said cylinder selectively to cause said piston to reciprocate, a member mounted to be moved by said piston and adapted, when moved in one direction, to tilt said movable jaw into engagement with said fixed jaw, and a connection engaging said member and said movable jaw and adapted, when said member is withdrawn, to open said movable jaw.

2. In combination in a welder handle, a pair of jaws, one of said jaws being fixed and the other being movably mounted upon said fixed jaw, and means for moving said movable jaw toward and from said fixed jaw, said means including a piston and cylinder assembly, and means for supplying air under pressure to said cylinder selectively to cause said piston to reciprocate, a member mounted to be moved by said piston and adapted, when moved in one direction, to move said movable jaw into engagement with said fixed jaw, and a connection engaging said member and said movable jaw and adapted, when said member is withdrawn, to open said movable jaw.

3. In combination in a welder handle, a pair of jaws, one of said jaws being fixed and the other being movably mounted upon said fixed jaw, and means for tilting said movable jaw toward and from said fixed jaw, said means including a piston and cylinder assembly, and means for supplying air under pressure to said cylinder selectively to cause said piston to reciprocate, a wedge member mounted to be moved by said piston and adapted, when moved in one direction, to tilt said movable jaw into engagement with said fixed jaw, and a connection engaging said wedge member and said movable jaw and adapted, when said wedge member is withdrawn, to open said movable jaw.

4. In combination in a welder handle, a pair of jaws, one of said jaws being fixed and the other being movably mounted upon said fixed jaw, and means for moving said movable jaw toward and from said fixed jaw, said means including a piston and cylinder assembly, and means for supplying air under pressure to said cylinder selectively to cause said piston to reciprocate, a wedge member mounted to be moved by said piston and adapted, when moved in one direction, to move said movable jaw into engagement with said fixed jaw, and a movable connection engaging said wedge member and said movable jaw and adapted, when said wedge member is withdrawn, to open said movable jaw.

5. In combination in a welder handle, a pair of jaws, one of said jaws being fixed and the other being movably mounted upon said fixed jaw, and means for moving said movable jaw toward and from said fixed jaw, said means including a piston and cylinder assembly, and means for supplying air under pressure to said cylinder selectively to either end thereof to cause said piston to reciprocate, a wedge member mounted to be moved by said piston and adapted, when moved in one direction, to move said movable jaw into engagement with said fixed jaw, and a connection engaging said wedge member and said movable jaw and adapted, when said wedge member is withdrawn, to open said movable jaw.

6. In combination in a welder handle, a pair of welder rod-gripping jaws, said jaws being mounted together for relative movement, means for holding said jaws together and for causing said relative movement, said means including a piston and cylinder assembly, and a valve assembly, said means for moving said jaws comprising a wedge member adapted to be moved by said piston, said wedge member adapted to wedge the other of said jaws together, a connection from said wedge member engaging one of said jaws and adapted, upon reverse movement of said wedge member, to move said jaw away from contact with the other jaw, and means for supplying air under pressure to said assembly, a valve and passages in said valve assembly, said valve adapted to be moved to direct air under pressure selectively to cause said piston to move.

7. In combination in a welder handle, a pair of welder rod-gripping jaws, said jaws being mounted together for relative movement, means for holding said jaws together and for causing said relative movement, said means including a piston and cylinder assembly, and a valve assembly, a handle positioned about said assemblies, said means for moving said jaws comprising a wedge member adapted to be moved by said piston, said wedge member adapted to wedge the other of said jaws together, a connection from said wedge member engaging one of said jaws and adapted, upon reverse movement of said wedge member, to move said jaw away from contact with the other jaw, and means for supplying air under pressure to said assembly, a valve and passages in said valve assembly, said valve adapted to be moved to direct air under pressure selectively to cause said piston to move.

8. In combination in a welder handle, a pair of welder rod-gripping jaws, said jaws being mounted together for relative movement, means for holding said jaws together and for causing said relative movement, said means including a piston and cylinder assembly, and a valve assembly, a non-conductive handle positioned about said assemblies, said means for moving said jaws comprising a wedge member adapted to be moved by said piston, said wedge member adapted to wedge the other of said jaws together, a connection from said wedge member engaging one of said jaws and adapted, upon reverse movement of said wedge member, to move said jaw away from contact with the other jaw, and means for supplying air under pressure to said assembly, a valve and passages in said valve assembly, said valve adapted to be moved to direct air under pressure selectively to cause said piston to move.

9. In combination in a welder handle, a pair of welder rod-gripping jaws, said jaws being mounted together for relative movement, means for holding said jaws together and for causing said relative movement, said means including a piston and cylinder assembly, and a valve assembly, said means for moving said jaws comprising a wedge member adapted to be moved by said piston, said wedge member adapted to wedge the other of said jaws together, a connection from said wedge member engaging one of said jaws and adapted, upon reverse movement of said wedge member, to move said jaw away from contact with the other jaw, and means for supplying air under pressure to said assembly, a valve and passages in said valve assembly, said valve adapted to be moved to direct air under pressure selectively to cause said piston to move, and air escape passages formed in said valve housing and adapted to direct air from said housing.

10. In combination in a welder handle, a pair of welder rod-gripping jaws, said jaws being mounted together for relative movement, means for holding said jaws together and for causing said relative movement, said means including a piston and cylinder assembly, and a valve assembly, said means for moving said jaws comprising a wedge member adapted to be moved by said piston, said wedge member adapted to wedge the other of said jaws together, a connection from said wedge member engaging one of said jaws and adapted, upon reverse movement of said wedge member, to move said jaw away from contact with the other jaw, and means for supplying air under pressure to said assembly, a valve and passages in said valve assembly, said valve adapted to be moved to direct air under pressure selectively to cause said piston to move, and air escape passages formed in said valve housing and adapted to direct air from said housing into the interior of said handle.

11. In combination in a welder handle, a pair of welder rod-gripping jaws, said jaws being mounted together for relative movement, means for holding said jaws together and for causing said relative movement, said means including a piston and cylinder assembly, and a valve assembly, said means for moving said jaws comprising a wedge member adapted to be moved by said piston, said wedge member adapted to slide along one of said jaws and to wedge the other of said jaws together, a connection from said wedge member engaging one of said jaws and adapted, upon reverse movement of said wedge member, to move said jaw away from contact with the other jaw, and means for supplying air under pressure to said assembly, a valve and passages in said valve assembly, said valve adapted to be moved to direct air under pressure selectively to cause said piston to move.

12. In combination in a welder handle, a pair of welder rod-gripping jaws, said jaws being mounted together for relative movement, means for holding said jaws together and for causing said relative movement, said means including a piston and cylinder assembly, and a valve assembly, said means for moving said jaws comprising a wedge member adapted to be moved by said piston, said wedge member adapted to wedge the other of said jaws together, a connection from said wedge member engaging one of said jaws and adapted, upon reverse movement of said wedge member, to move said jaw away from contact with the other jaw, and unitary means for supplying air under pressure and electrical current to said assembly, a valve and passages in said valve assembly, said valve adapted to be moved to direct air under pressure selectively to cause said piston to move.

13. In combination in a welder handle, a pair of welder rod-gripping jaws, said jaws being mounted together for relative movement, means for holding said jaws together and for causing said relative movement, said means including a piston and cylinder assembly, and a valve assembly, said means for moving said jaws comprising a wedge member adapted to be moved by said piston, said wedge member adapted to wedge the other of said jaws together, a connection from said wedge member engaging one of said jaws and adapted, upon reverse movement of said wedge member, to move said jaw away from contact with the other jaw, and means for supplying air under pressure to said assembly, a valve and passages in said valve assembly, said valve adapted to be moved to direct air under pressure selectively to either end of said cylinder to cause said piston to move toward one or the other end of said cylinder.

14. In combination in a welder handle, a pair of welder rod-gripping jaws, said jaws being mounted together for relative movement, means for holding said jaws together and for causing said relative movement, said means including a piston and cylinder assembly, and a valve assembly, a non-conductive handle positioned about said assemblies, said means for moving said jaws comprising a wedge member adapted to be moved by said piston, said wedge member adapted to slide along one of said jaws and to wedge the other of said jaws together, a connection from said wedge member engaging one of said jaws and adapted, upon reverse movement of said wedge member, to move said jaw away from contact with the other jaw, and unitary means for supplying air under pressure and electrical current to said assembly, a valve and passages in said valve assembly, said valve adapted to be moved to direct air under pressure selectively to either end of said cylinder to cause said piston to move toward one or the other end of said cylinder, and air escape passages formed in said valve housing and adapted to direct air from said housing into the interior of said handle.

15. In combination in a welder handle, a pair of jaws joined together for relative movement, and fluid pressure responsive means for moving said jaws, said fluid pressure responsive means including a member mounted between said jaws, a connection between said member and said pressure responsive means, whereby said member is moved between said jaws to force them together, and a connection between one of said jaws and said member, whereby when said member is moved in the opposite direction, it moves said jaws apart, and control means for said fluid pressure responsive means adapted to direct said pressure responsive means to move said member to move said jaws.

16. In combination in a welder handle, a pair of welder rod gripping jaws, said jaws being mounted together for relative movement, means for moving and holding said jaws together, and means for causing relative movement of the jaws, said means including a fluid pressure actuated assembly, said means for holding and moving said jaws together comprising a wedge member, a connection between said wedge member and said fluid pressure actuated assembly, said wedge member adapted to wedge the jaws toward each other and to hold them in position about a rod, and a connection from said wedge member engaging one of said jaws, said connection adapted upon movement of said wedge member in one direction to cause relative movement of said jaws away from each other, and means for supplying fluid pressure to said assembly.

LESTER W. WACHTER.
ARTHUR KIMBER.

REFERENCES CITED

The following references are of record in the file of this patent:

UNITED STATES PATENTS

| Number | Name | Date |
| --- | --- | --- |
| 1,493,864 | Orr | May 13, 1924 |
| 1,621,512 | Kotchi | Mar. 22, 1827 |
| 1,842,627 | Ross | Jan. 26, 1932 |
| 2,150,464 | Smith | Mar. 14, 1939 |